United States Patent Office 3,259,675
Patented July 5, 1966

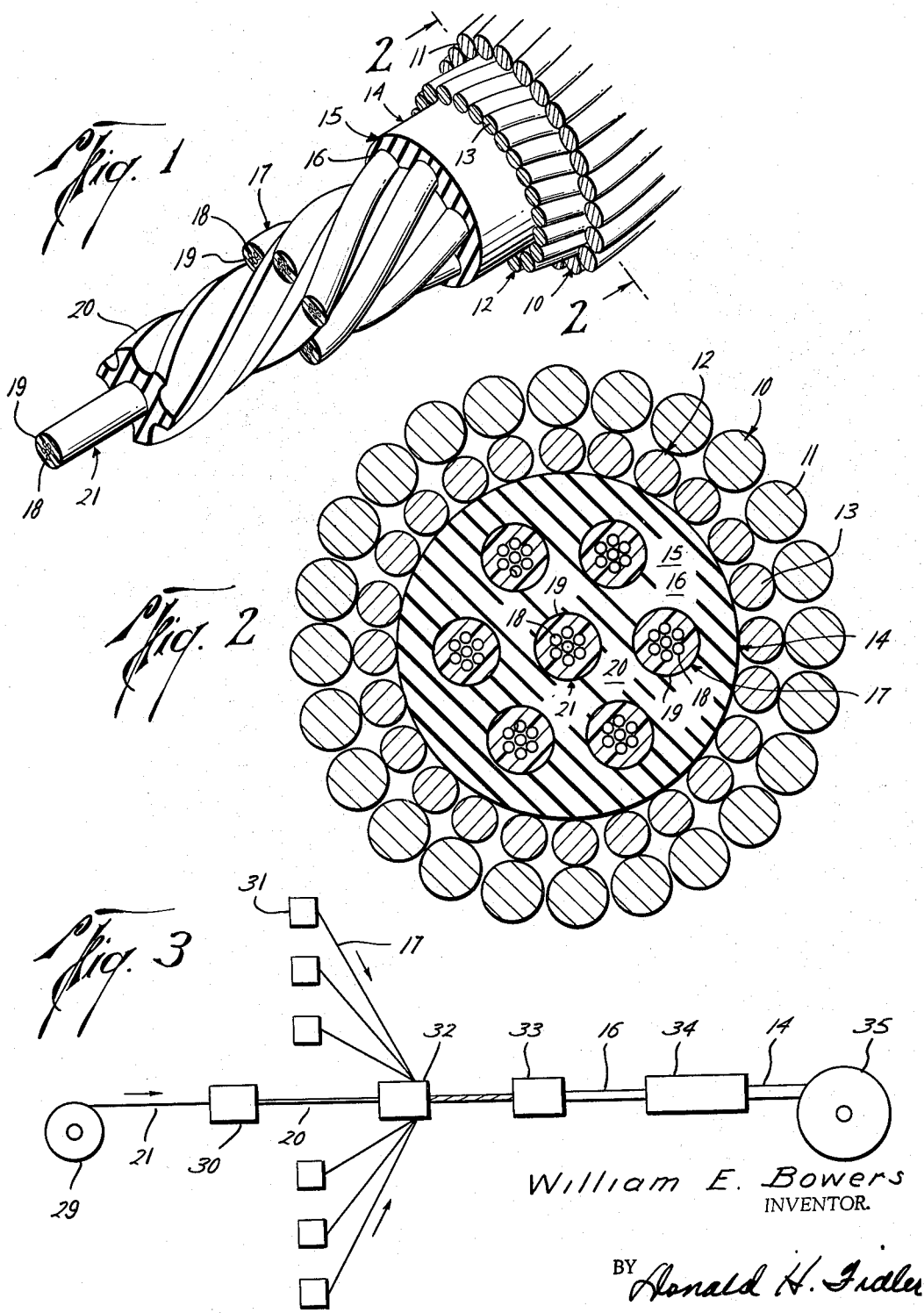

3,259,675
METHODS FOR MANUFACTURING ARMORED CABLES
William E. Bowers, Houston, Tex., assignor to Schlumberger Well Surveying Corporation, Houston, Tex., a corporation of Texas
Original application Dec. 29, 1960, Ser. No. 79,390. Divided and this application June 18, 1963, Ser. No. 288,761
8 Claims. (Cl. 264—103)

This application is a divisional application of my patent application Serial No. 79,390, filed December 29, 1960, and now abandoned, for "Armored Cables and Methods for Manufacturing Armored Cables."

This invention relates to a method for manufacturing load-bearing, multiconductor, electrical cables. More particularly, the cables considered are of the type employed in the logging of boreholes drilled into earth formations.

In the performance of well logging and other similar subsurface operations, instruments are lowered into boreholes, often to depths of twenty thousand feet or more, by means of a cable which is spooled upon a mobile field unit. The physical conditions to which such cables are subjected by the borehole environment may be extremely harsh. For example, the cable is subject to severe abrasion by contact with the borehole wall; temperatures of 350° Fahrenheit or more are not uncommon in very deep boreholes; the hydrostatic pressure of the drilling fluid within the borehole may reach ten thousand pounds per square inch in even a comparatively shallow well; the fluids within the borehole are often extremely saline; and the cable may be subjected to chemical degradation by oil, gas or other chemicals. Under such conditions, a well logging cable must perform satisfactorily the functions of: (1) a wire rope having sufficient strength to support its own weight and the weight of the borehole instruments plus an additional margin of strength to provide for emergency tensions and a reasonable safety factor; (2) a multiconductor transmission line to conduct electrical power and signals between the borehole instruments and the surface equipment without excessive electrical leakage or signal attenuation; and (3) a depth measuring line to locate the borehole instruments accurately with respect to a surface datum. Moreover, to satisfy the requirements of mobility and length, the cables must be of relatively small diameter and light weight.

The above requirements have led to a general form of construction in well logging cables which comprises at least two concentric layers of load-bearing, metallic armor strands helically wound in opposite directions about a core which contains a plurality of insulated, electrical conductors. The invention relates specifically to a new and improved core in such multiconductor well logging cables and to a method of constructing the same; and an exemplary seven-conductor core will be considered herein for purposes of explanation. However, before considering the invention, a discussion of the cable art will be provided so that the invention may be more fully understood in its specific aspects.

A typical seven-conductor cable core may comprise a central insulated electrical conductor arranged substantially coextensive with the longitudinal axis of the core and six outer insulated electrical conductors helically wound about, and in direct contact with, the central insulated conductor. The insulation for the conductors may consist, for example, of individual tubular sheaths of a rubber compound extruded about each of the conductors. In order to make the core relatively compact, the diameter of the insulating sheaths and the lay angles of the outer insulated conductors are selected so that adjacent outer conductors are in direct contact with one another. Cotton fillers are placed in the external interstices between adjacent outer conductors to give the core a generally cylindrical form. This core assembly of insulated conductors and fillers is enclosed within a tubular sheath, which may consist, for example, of braided nylon strands. The sheath serves to protect the conductor insulation from being damaged by the inner layer of armor strands. Alternatively, in place of the braided sheath a layer of tape may be wrapped about the assembly.

Because of the extreme length and close proximity of the conductors in a well logging cable, electrical shielding must be utilized to reduce the effects of capacitive coupling between conductors. For this purpose, the outer surface of the insulating sheath on each conductor is coated with a thin, electrically semiconductive film and the cotton fillers and nylon braid (or tape) are impregnated with an electrically semiconductive compound. These steps are generally performed before assembly of the core by dipping the individual components in a semiconductive solution and then drying them to leave a semiconductive residue.

Thus, in the finished cable, each insulated conductor is surrounded by a semiconductive film which is electrically connected to the armor strands through contact with the impregnated fillers or braids (or tape); and the armor strands are normally maintained at electrical ground potential through contact with the drilling fluid within the borehole or through an electrical ground connection at the surface.

While cables with the above-described type of core are widely employed in the well logging industry, they have not been found entirely satisfactory. Among their disadvantages are the following:

First, they are difficult to fabricate. When such cables are placed in tension, the helically wound armor strands exert upon the core assembly a pressure which may approach, for example, five thousand pounds per square inch for a cable tension of only several thousand pounds. In order to prevent the core assembly from being damaged by this pressure, it is necessary that the armor strands lie close together to substantially cover the core assembly. Such full and uniform armor coverage requires that the diameter of the core assembly be maintained within extremely close limits of accuracy, and such control is difficult to achieve with the type of "built-up" construction presently utilized.

Second, the length stability of the cables is poor. In order to measure accurately the depth of borehole instruments, it is important that changes in the length of a given section of well logging cable be determinable. Changes in cable length resulting from "elastic deformation," which is a change in length with tension, or "thermal deformation," which is a change in length with temperature, may be determined with reasonable accuracy during well logging operations by measuring the cable tension and the borehole temperature and computing the true length from previously derived charts. However, if an irreversible deformation takes place, the cable length cannot be determined without actually remeasuring the cable by comparison with a length standard. The term "length stability," as used herein, is intended to denote the property of a cable to resist such irreversible deformations. It has been found that, as well logging cables of the above described type are used, irreversible deformation does take place, particularly during the early periods of use. This results primarily from the presence in the fillers and between the conductors and fillers of numerous void spaces, which permit the core to compact under pressure by the borehole fluid and the armor strands. Thus, the core diameter becomes permanently smaller with a corresponding increase in cable length. Such cables must be remeasured frequently, at least during the early stages of use when most of the elongation occurs; or, alternatively, a method of treatment known as "hot prestressing" may be used to induce most of the compaction before the cable is used in the field. This method is described in copending application Serial No. 570,780, entitled "Methods for Processing Cables," filed by Andre Blanchard on March 12, 1956. While this method affords a partial solution to the length stability problem, alterations of the lay angles of the conductors and armor strands resulting from cable elongation may lead to strains in particular portions of the cable or to other undesirable effects. Hence, reduction of core compaction would be a preferred solution.

Third, the maximum operating temperature of the cables is limited by the physical properties of the conductor insulation and the braid (or tape) materials. As is well known, rubber materials are available in a vast variety of compounds which may be varied to satisfy differing requirements of hardness, temperature properties, electrical properties, resilience, oil and gas resistance, heat resistance, etc. However, particular properties often can be obtained only at the expense of others; hence, those rubber compounds which have the electrical properties required to properly insulate the conductors do not have the physical properties required to withstand the pressure of the armor strands at the temperatures encountered in borehole use. One of the functions of the braided sheath (or tape) about the exterior of the core assembly is to assist in containing the presently utilized rubber compound and prevent it from extruding between the armor strands when the cable is hot and under tension. However, even these materials are not adequate to confine the rubber compounds at temperatures much higher than 350° Fahrenheit.

Fourth, the cables are not highly resistant to the chemical effects of oil or gas. The conductor insulation is particularly susceptible to degradation by oil or gas, due primarily to the above described necessity of sacrificing some properties in order to secure other desired properties.

And fifth, the electrical transmission characteristics of the cables are not entirely satisfactory. This is also due, at least in part, to the above described necessity for compromise in the selection of materials for conductor insulation. For example, the insulation resistance of the compounds usable with the present form of construction tends to decrease substantially with increase in temperature. Moreover, these compounds have a relatively high dielectric constant, which results in a relatively high capacitance to ground for each individual conductor. Further, the previously described method of electrical shielding to reduce the effects of capacitive coupling between conductors is not entirely effective. Perfect shielding would exist if all parts of each conductive film around the individual conductors had zero resistance to electrical ground. This condition is achieved to a practical degree for those portions of each film which are in direct contact with the braid or fillers since current flow to electrical ground is through a large cross section for a very short length. However, as is evident from the previously described structural configuration of the core, less than half of the film around each insulated conductor is in such direct contact, and the remaining portions of the films may have a relatively high resistance to ground since current must flow along the film for a relatively great length. The central conductor in particular is poorly shielded since its boundary film has no direct contact with the fillers or braid. Additional resistance is introduced by breaks and discontinuities in the films resulting from inherent limitations in the process for applying the films or from subsequent strains or flexures.

Accordingly it is an object of the invention to provide a new and improved method of fabricating a load-bearing, multiconductor, electrical, well logging cable.

This and other objects are attained, in accordance with the invention, by providing an armored well logging cable with a core that improves the characteristics of the cable with respect to the above described deficiencies of the prior art. The core comprises a plurality of electrical conductors individually encased within tubular sheaths of dielectric material, arranged in spaced-apart relationship, and embedded within a generally cylindrical matrix comprising a hard, semiconductive elastomer. The exemplary seven-conductor core described herein incorporates an arrangement of conductors wherein a central insulated conductor is substantially coextensive with the central axis of the core and six outer insulated conductors are arranged helically in spaced-apart relationship about the central axis and away from the central insulated conductor.

In accordance with the method aspect of the invention, a new and improved method of fabricating a well logging cable with a core of the type described above is provided. For example, to fabricate an exemplary seven-conductor cable as described herein, tubular sheaths of dielectric material are extruded about each of the conductors. The central insulated conductor is processed through another extruding machine to be covered with an uncured layer of the semiconductive matrix material. The outer insulated conductors are wound in spaced-apart relationship about this inner layer of uncured matrix material and under sufficient tension to partially embed them in its surface. This assembly is processed through a further extruding machine to be covered with an uncured outer layer of the matrix material, thus completing the core assembly. The matrix material may then be cured and the layers of armor strands wound concentrically about its outer surface; or, alternatively, the inner layer of armor strands may be wound before the matrix material is completely cured and under sufficient tension to partially embed the strands into its surface.

The invention may best be understood, and further objects and advantages will become apparent, from the following detailed description, taken in conjunction with the accompanying drawings, in which:

FIG. 1 is a view in perspective of an armored, well logging cable constructed in accordance with the invention with successive components broken away to show the details of the cable construction;

FIG. 2 is a view in cross section of the cable shown in FIG. 1; and

FIG. 3 is a schematic illustration of apparatus for carrying out the method aspect of the invention.

The typical embodiment of the invention shown in FIGS. 1 and 2 comprises a seven-conductor core 14 surrounded by two concentric layers of load-bearing armor strands 10 and 12. The inner layer of armor strands 12 comprises a plurality of metallic strands 13 wound with a right hand lay about the core 14; and the outer layer of armor strands 10 similarly comprises a plurality of metallic strands 11 wound with a left hand lay about the inner layer 12. The number, size and pitch of the strands 11 and 13 are chosen so that the inner layer 12 substantially covers the core 14 and the outer layer 10 substantially covers the inner layer 12. The armor strands perform the load-bearing functions of the cable and further serve to protect the core 14 from physical abuse and damage. Well logging cables employing concentric layers of armor strands, such as 10 and 12, are well known in the art and further disclosure of particular materials, number and size of strands, or pitch angles is therefore considered unnecessary.

The core 14 comprises a central insulated conductor 21 arranged substantially coextensive with the central axis of the cable, six outer insulated conductors 17 wound with a left hand lay in spaced-apart relationship about the central axis and away from the central insulated conductor 21, and a monolithic matrix 15 having a generally cylindrical outer boundary and encasing all of the conductors and filling all the core space not occupied by the conductors. Each of the insulated conductors 17 and 21 comprises a group of metallic, stranded wires 18 surrounded by a tightly fitted, tubular sheath of insulating material 19. Insulating material 19 is preferably an extrudable plastic which affords a high quality of electrical insulation for a relatively thin section and which has a relatively low dielectric constant. For extremely high temperature applications, a preferred insulating material 19 may be, for example, a suitable one of the group of fluorinated ethylene propylene plastics manufactured by E. I. du Pont de Nemours & Co., Inc., and sold under the trademark "Teflon," and, more particularly, Teflon 100–X FEP-fluorocarbon resin. This material has a maximum recommended operating temperature of 400° Fahrenheit but will operate satisfactorily at much higher temperatures for the short periods of time required in well logging use. For lower temperature applications, there may be employed a suitable one of the polypropylene plastics, as, for example, the product manufactured by Enjay Co., Inc., a division of Humble Oil & Refining Co., and sold under the trademark "Escon" or the product manufactured by Hercules Powder Co., and sold under the trademark "Pro-fax." These materials have maximum recommended operating temperatures in excess of 300° Fahrenheit.

Each of the above-described materials has a dielectric constant of approximately 2, whereas the insulating materials usable with the present form of construction have dielectric constants of approximately 5. Thus, the capacitance to ground of the conductors is substantially reduced. Moreover, the above materials provide much better electrical insulation even though a thinner wall section is utilized. For example, a cable constructed in accordance with the invention and utilizing a sheath of the above-described "Teflon" with a wall thickness of .008" exhibited an insulation resistance to 500 volts D.C. of approximately $10^{10}$ ohms/1000' when placed in water at 350° Fahrenheit, whereas a cable constructed in accordance with the present state of the art and utilizing a synthetic rubber sheath with a .030" wall thickness exhibited insulation resistance of about $10^4$ ohms/1000' under the same test conditions.

The matrix 15, as clearly shown in FIG. 2, is a monolithic mass of material which encases all the insulated conductors, fills all the core space not occupied by the conductors, and defines the outer surface of the core. However, in FIG. 1, for purposes of illustration and description, matrix 15 has been broken away to show an outer matrix section 16 and an inner matrix section 20. Inner matrix sections 20 surrounds central conductor 21 and maintains the outer conductors 17 in spaced-apart relationship and away from central conductor 21. Outer matrix section 16 covers the outer conductors 17 and is of sufficient thickness to protect the insulating material 19 from physical abuse or damage. It is emphasized that sections 16 and 20 are not separate structural elements, at least in the finished core, and the terms are merely descriptive of portions of a monolithic mass of semiconductive material which encases the insulated conductors 17 and 21.

To provide electrical shielding for reducing the effects of capacitive coupling between conductors, the material used for matrix 15 is electrically semiconductive. Thus, each of the conductors 17 and 21 is surrounded by portions of a monolithic, semiconductive mass of material which has its outer surface in direct contact with the grounded inner layer of armor strands 21. The arrangement of outer conductors 17 in a spaced-apart relationship and away from central conductor 21 provides an electrical path of relatively large cross-sectional area from any point within matrix 15 to the grounded armor strands 12. Even though matrix 15 may have a higher volume resistivity than the conductive films utilized in the prior art cables, the greater cross-sectional area of the electrical paths plus the absence of breaks and discontinuities within the shielding material, as provided by the invention, results in lower electrical resistances to ground, particularly from points within the interior portions of the matrix.

The material for matrix 15 is preferably an extrudable, semiconductive, oil-and-gas-resistant elastomer which cures to a hard, flexible, relatively incompressible form and maintains its physical properties at borehole temperatures and pressures. For example, various compounds of the acrylonitrile-butadiene rubbers, such as the product manufactured by B. F. Goodrich Chemical Co. and sold under the trademark "Hycar," may be employed. As a further example, there may be utilized various compounds of the polychloroprene rubbers (commonly known as neoprenes); and, in particular, a compound utilizing a non-sulphur modified general purpose neoprene, such as type W, has been employed.

The products described above for use as insulating material 19 and as material for matrix 15 and other products having similar properties are well known to the art and the materials as such form no part of the present invention. However, the use of such materials is permitted only by the novel and useful form of construction provided by the invention. For example, the previously described "Teflon" material, which is known to be a superior electrical insulator and to have a low dielectric constant, could not be satisfactorily substituted for the insulating materials used in present well logging cables since, for example, its physical properties are not adequate to resist the pressure exerted by the armor strands and there is no practical method of applying a shielding film to its outer surface.

Referring now to FIG. 3, there is illustrated schematically apparatus for fabricating, in accordance with the method aspect of the invention, a well logging cable of the type shown in FIGS. 1 and 2. The insulating material 19 is extruded about the individual stranded wires 18 (shown in FIGS. 1 and 2) in a conventional manner (apparatus not shown) and the insulated conductors 17 and 21 are then wound upon reels 31 and 29, respectively. The central insulated conductor 21 is processed from reel 29 through a conventional extruding machine 30 where the uncured inner matrix section 20 is extruded about it. Reels 31, upon which are wound outer conductors 17, are mounted upon a conventional winding machine (not shown) which may be rotated about the path of central conductor 21; and conductors 17 are threaded through a winding die 32 which guides them into spaced-apart positions about inner matrix section 20 as the winding machine is rotated. During the winding operation, conductors 17 are kept under sufficient tension to partially embed them in the surface of uncured inner matrix section 20. Thus, portions of inner matrix section 20 will protrude between adjacent ones of outer conductors 17. From winding die 32 the assembly passes to a second conventional extruding machine 33 where the uncured outer matrix section 16 is extruded about it. A long hand die is preferably used in extruding machine 33 so as to fill throughly the interstices between outer conductors 17 and thereby form a union between outer matrix section 16 and the portions of inner matrix section 20 protruding between adjacent ones of the outer conductors. The assembled core is then passed through a conventional curing oven 34 to cure the matrix material and the finished core 14 may be spooled upon reel 35. Alternative known methods of curing, as, for example, pan curing or curing by means of chemical accelerators, may of course be utilized. After curing, core 14 may be drawn through a conventional armoring machine (not illustrated) which performs armor strands 11 and 13 and winds them in concentric layers 10 and 12 about the core, as shown in FIGS. 1 and 2.

Since the final layer of the core is applied by extrusion, its diameter may be controlled with great accuracy, thus permitting better control of the coverage of the inner layer of armor strands.

A further improvement in armor coverage may be effected by winding at least the inner layer of armor strands 12 before the core is completely cured and winding them under sufficient tension to partially embed them in the surface of the matrix. After curing, the outer surface of core 14 will be permanently ridged to fit the interstices between the inner armor strands 13. Thus, the core will not tend to undergo further permanent deformation when the cable is placed under tension at high temperatures and the diameters of the armor strand layers 10 and 12 will tend to remain more constant.

While a specific well logging cable has been disclosed herein for purposes of explanation, it should be apparent that cables incorporating different conductor arrangements and comprising more or less than seven conductors may be constructed without departing from the scope of the invention in its broader aspects. Accordingly, the invention is not to be limited except as defined in the appended claims.

What is claimed is:

1. In a method of manufacturing an armored, load-bearing, multiconductor, electrical cable, the steps of: extruding an elongated inner matrix section of generally circular cross section; arranging a plurality of elongated, insulated, electrical conductors in spaced-apart relationship about the outer surface of said elongated inner matrix section and coextending longitudinally of said section while maintaining sufficient tension on said insulated conductors to partially embed them in said surface; extruding an outer matrix section of generally cylindrical outer periphery about said arranged insulated conductors and inner matrix section to form, together with said inner matrix section, a matrix completely encasing said insulated conductors, said inner and outer matrix sections comprising an uncured, semiconductive elastomer; and curing said elastomer to form a monolithic matrix.

2. In a method of manufacturing an armored, load-bearing, multiconductor, electrical cable the steps of: extruding an inner matrix section comprising an uncured, semiconductive elastomer concentrically about an insulated electrical conductor; arranging a plurality of insulated electrical conductors in spaced-apart relationship about said inner matrix section while maintaining sufficient force on said plurality of insulated conductors to partially embed them in the surface of said inner matrix section; extruding an outer matrix section comprising said elastomer about said assembled conductors and inner matrix section; and curing said elastomer.

3. The method of manufacturing a load-bearing, multiconductor, electrical cable comprising the steps of: extruding separate sheaths of plastic insulating material concentrically about each of a plurality of elongated electrical conductors; extruding a cylindrical inner matrix section comprising an uncured, semiconductive elastomer; arranging said insulated conductors helically in spaced-apart relationship about said inner matrix section while maintaining force on said insulated conductors to partially embed said conductors in the surface thereof; extruding an outer matrix section comprising said uncured, semiconductive elastomer about said inner matrix section and arranged insulated conductors to form, together with said inner matrix section, a matrix of generally cylindrical, smooth outer periphery which completely encases said insulated conductors; curing said elastomer to form a monolithic matrix; winding a first layer of load-bearing armor strands helically about the outer surface of said matrix; and winding a second layer of load-bearing armor strands helically about said first layer and in the opposite direction.

4. The method of manufacturing a load-bearing, multiconductor, electrical cable comprising the steps of: extruding a tubular sheath of plastic insulating material concentrically about each of a plurality of elongated, metallic, electrical conductors; extruding an inner matrix section of a generally circular cross section comprising an uncured, semiconductive elastomer concentrically about one of said insulated conductors; winding said other insulated conductors helically in spaced-apart relationship about the outer surface of said inner matrix section while said elastomer is at least partially uncured and while maintaining sufficient tension on said insulated conductors to partially embed them in said surface; extruding an outer matrix section comprising said uncured, semiconductive elastomer about said wound insulated conductors and inner matrix section to form, together with said inner matrix section, a matrix of generally cylindrical outer periphery which completey encases said insulated conductors; curing said elastomer to form a monolithic matrix; winding a first layer of metallic armor strands helically in one direction and in side-by-side relationship about the outer surface of said matrix and substantially covering said matrix; and winding a second layer of metallic armor strands helically in the direction opposite to said one direction and in side-by-side relationship about said first layer and substantially covering said first layer.

5. The method of manufacturing a load-bearing, multiconductor, electrical cable comprising the steps of: extruding an elastomer to form a cylindrical inner matrix section; arranging insulated conductors helically in spaced-apart relationship about the outer cylindrical surface of said inner matrix section while maintaining sufficient tension on said insulated conductors to partially embed them in said surface; extruding an elastomer outer matrix section about said inner matrix section and arranged insulated conductors to form, together with said inner matrix section, a matrix having a generally cylindrical, outer periphery and which matrix completely encases said insulated conductors; and winding a layer of load-bearing armor strands helically about the outer surface of said matrix under sufficient tension to partially embed said armor strands in the outer periphery of said matrix.

6. The method of manufacturing a load-bearing, multiconductor, electrical cable comprising the steps of: extruding a cylindrical inner matrix section of uncured elastomer; arranging insulated conductors helically in spaced-apart relationship about the outer cylindrical surface of said inner matrix section while maintaining sufficient tension on said insulated conductors to partially embed them in said surface; extruding an outer matrix section of said uncured elastomer about said inner matrix section and arranged insulated conductors to form, when cured together with said inner matrix section, a monolithic matrix having a generally cylindrical, outer periphery and which monolithic matrix completely encases said insulated conductors; winding a layer of load-bearing armor strands helically about the outer surface of said matrix under sufficient tension to partially embed said armor strands in the outer periphery of said matrix; and curing said elastomer to form a monolithic matrix having its outer surface permanently ridged in the interstices between said armor strands.

7. In a method of manufacturing an armored, load-bearing, multiconductor, electrical cable, the steps of: arranging a plurality of elongated, insulated, electrical conductors in spaced-apart relationship about an elongated, generally cylindrical inner matrix section and coextending longitudinally of said section while maintaining sufficient force on said plurality of conductors to partially embed them therein, said partially embedded conductors partially extending beyond the outer periphery of said inner matrix and said inner matrix partially filling the interstices between said conductors; extruding an outer matrix section onto and about said arranged insulated conductors and inner matrix section to form, together with said inner matrix section, a matrix completely encasing said insulated conductors, said inner and outer matrix sections comprising an uncured, semiconductive elastomer; and curing said elastomer to form a monolithic matrix.

8. In a method of manufacturing an armored, load-bearing, multiconductor, electrical cable, the steps of: applying forces to a plurality of elongated, insulated, electrical conductors to partially embed said conductors in spaced-apart relationship in the outer surface of an elongated, generally cylindrical inner matrix section and coextending longitudinally of said section, said section comprising a smooth, uncured, semiconductive elastomer; extruding an uncured elastomer over such partially embedded conductors and inner matrix section to form an outer matrix section which together with said inner matrix section completely encases said insulated conductors into a completely solid mass; and curing said inner and outer matrix sections to form a hard, monolithic matrix in which said insulated conductors are embedded.

References Cited by the Examiner

UNITED STATES PATENTS

| | | | |
|---|---|---|---|
| 1,977,209 | 10/1934 | Sargent | 264—174 |
| 1,982,288 | 11/1934 | Evans | 264—103 X |
| 2,199,526 | 5/1940 | McCowen | 264—171 X |
| 2,544,503 | 3/1951 | Kennedy | 156—56 X |
| 2,810,424 | 10/1957 | Swartswelter et al. | 264—103 |

FOREIGN PATENTS

| | | |
|---|---|---|
| 205,315 | 12/1956 | Australia. |
| 526,895 | 9/1940 | Great Britain. |

ROBERT F. WHITE, *Primary Examiner.*

M. R. DOWLING, *Assistant Examiner.*